United States Patent [19]

Ishikawa et al.

[11] Patent Number: 4,991,464
[45] Date of Patent: Feb. 12, 1991

[54] ENGINE BRAKE CONTROL DEVICE FOR AN AUTOMATIC TRANSMISSION

[75] Inventors: Kazunori Ishikawa; Kazumasa Tsukamoto, both of Toyota; Takuji Taniguchi, Wakamatsu; Yuji Kashihara, Toyota; Kunihiro Iwatsuki, Toyota; Hiroji Taniguchi, Toyota, all of Japan

[73] Assignees: Aisin Aw Co., Ltd.; Toyota Jidosha Kabushiki Kaisha, Aichi, Japan

[21] Appl. No.: 313,234

[22] Filed: Feb. 21, 1989

[30] Foreign Application Priority Data

Feb. 20, 1988 [JP] Japan .................................. 63-37882
Mar. 23, 1988 [JP] Japan .................................. 63-70157

[51] Int. Cl.⁵ ........................................... B60K 41/18
[52] U.S. Cl. ........................................... 74/866
[58] Field of Search ................................. 74/866

[56] References Cited

U.S. PATENT DOCUMENTS

| 3,726,157 | 4/1973 | Marumo | 74/866 X |
| 3,741,043 | 6/1973 | Oya et al. | 74/866 |
| 3,881,368 | 5/1975 | Furuhashi et al. | 74/866 |
| 4,262,783 | 4/1981 | Scarrott et al. | 74/866 X |
| 4,350,234 | 9/1982 | Suga et al. | 74/866 X |
| 4,680,992 | 7/1987 | Hayasaki et al. | 74/866 X |
| 4,690,017 | 9/1987 | Taniguchi et al. | 74/866 |
| 4,770,066 | 9/1988 | Kayasaki et al. | 74/867 |
| 4,782,724 | 11/1988 | Furusawa et al. | 74/867 |

FOREIGN PATENT DOCUMENTS 0214467 3/1987 European Pat. Off.

Primary Examiner—Dirk Wright
Attorney, Agent, or Firm—Wenderoth, Lind & Ponack

[57] ABSTRACT

Hydraulic pressure which is regulated by a pressure control valve (linear solenoid valve) is applied to a hydraulic servo of a brake which is actuated when an engine-brake is effected. When the engine-brake is effected, a hydraulic pressure which is modulated by a modulator valve controlled by the linear solenoid valve is applied to the brake hydraulic servo. The pressure control valve provides high hydraulic pressure when vehicle speed is high based on signals from a speed sensor, and provides low hydraulic pressure when vehicle speed is low based on signals from the speed sensor, so that an engine-brake force is adequately controlled in accordance with vehicle speed. Furthermore, if a foot brake sensor is employed, the hydraulic pressure in accordance with vehicle speed can be made low when the engine-brake is effected with the foot brake applied. Based on signals from a front wheel rotation sensor and a rear wheel rotation sensor, the control unit calculates a rotational difference, so that the engine-brake force can be made low when the rotational difference is large.

10 Claims, 10 Drawing Sheets

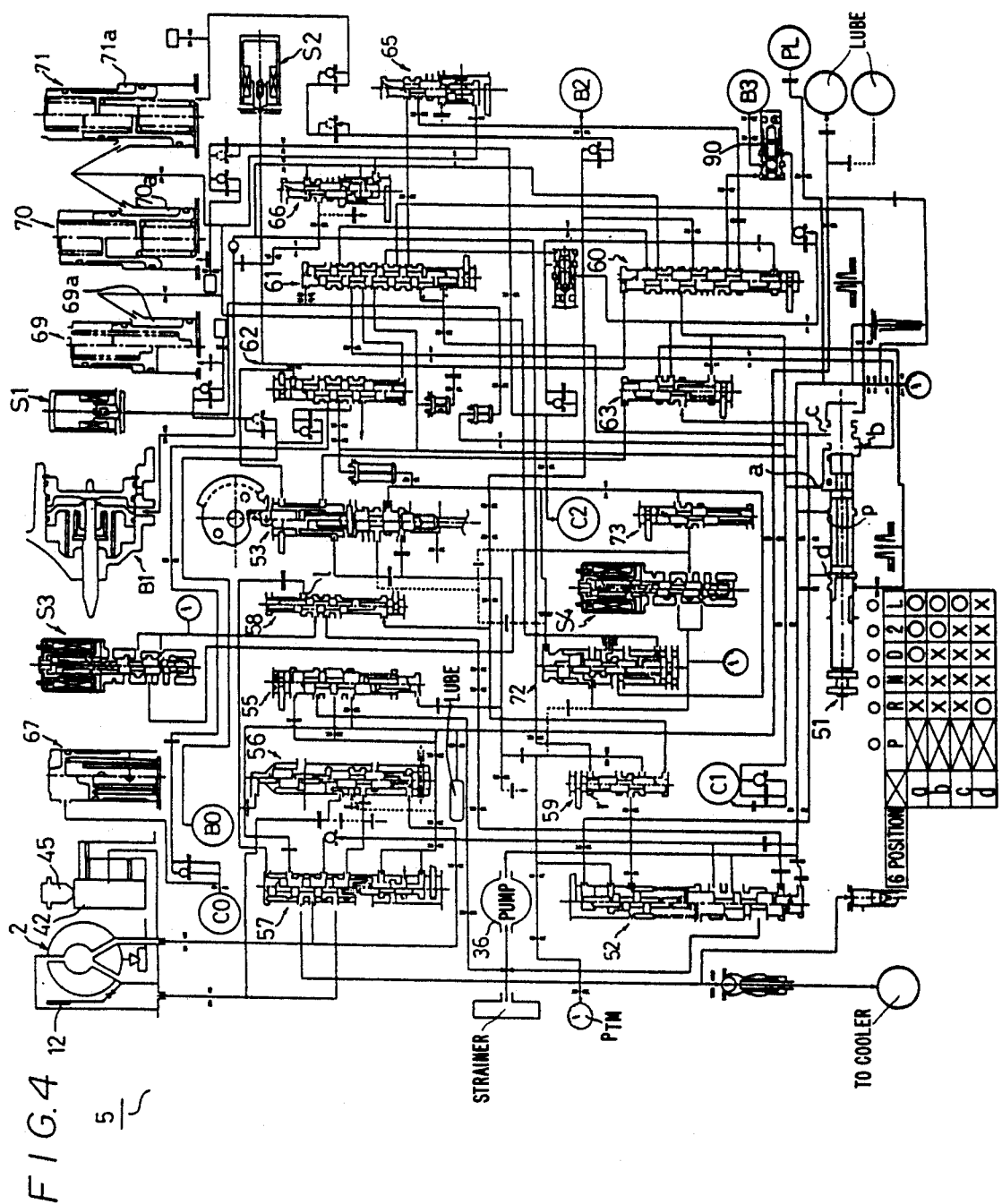

FIG. 5

| POSITION | | SOLENOID | | | CLUTCH | | | BRAKE | | | | ONE-WAY CLUTCH | | |
|---|---|---|---|---|---|---|---|---|---|---|---|---|---|---|
| | | S1 | S2 | S3 | C1 | C2 | C0 | B1 | B2 | B3 | B0 | F1 | F2 | F0 |
| P | | O(X) | X | X | X | X | O | X | X | X | X | X | X | X |
| R | | O(X) | X | X | X | O | O | X | X | O | X | X | X | O |
| R (V≥7) | | O(X) | O | X | X | X | O | X | X | X | X | X | X | O |
| N | | O(X) | X | X | X | X | O | X | X | X | X | X | X | X |
| D | 1ST | O | X | X | O | X | O | X | X | X | X | X | ⊗ | O |
| | 2ND | O | O | ⊚ | O | X | O | X | O | X | X | ⊗ | X | O |
| | 3RD | X | O | ⊚ | O | O | O | X | O | X | X | X | X | O |
| | 4TH | X | X | ⊚ | O | O | X | X | O | X | O | X | X | X |
| 2 | 1ST | O | X | X | O | X | O | X | X | X | X | X | ⊗ | O |
| | 2ND | O | O | ⊚ | O | X | O | O | O | X | X | O | X | O |
| | 3RD | X | O | ⊚ | O | O | O | X | O | X | X | X | X | O |
| | (3RD) | X | X | X | O | O | O | X | O | X | X | X | X | O |
| L | 1ST | O | X | X | O | X | O | X | X | O | X | X | O | O |
| | 2ND | O | O | X | O | X | O | O | O | X | X | O | X | O |
| | (1ST) | X | X | X | O | X | O | X | X | O | X | X | O | O |

| REMARKS | | | | |
|---|---|---|---|---|
| | O | ON | ENGAGE | LOCK |
| | X | OFF | RELEASE | FREE |
| | ⊚ | ON·L-UP ON / OFF·L-UP OFF | — | — |
| | ⊗ | — | — | FREE AT COSTING |

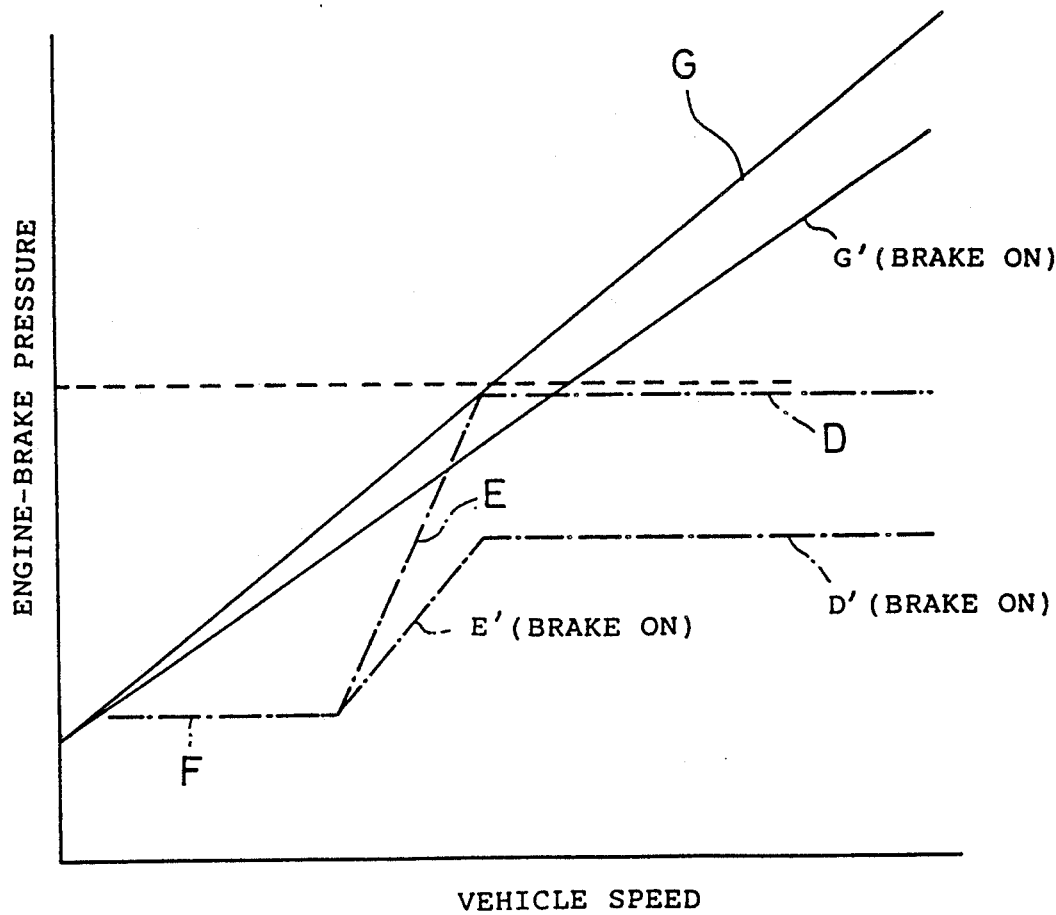

(a)

(b)

ENGINE BRAKE CONTROL DEVICE FOR AN AUTOMATIC TRANSMISSION

BACKGROUND OF THE INVENTION

1. Field of the Invention

The present invention relates to a hydraulic control device for an automatic transmission of an engine, and in particular to a hydraulic control device for an automatic transmission mounted on an automobile. Even more specifically, the present invention relates to an engine-brake control device for controlling hydraulic pressure in a brake hydraulic servo of a brake directly restraining a friction-engaging element of a shift gear mechanism.

2. Description of the Prior Art

Conventionally, an automatic transmission effects an engine-brake in a second range (or S range) or in an L range by actuating a second-coast brake (at 2nd speed) to retrain a front and rear sun gear, or by actuating a first & reverse brake (at 1st speed).

Generally, hydraulic servos for the second-coast brake and the first & reverse brake are supplied with modulated pressure from a second-coast modulator valve or a low-coast modulator valve.

As shown in Japanese Laid Open Patent No. Sho-62-77245, with reference to an exhaust brake attached automatic transmission, an engine-brake control device has been proposed in which line pressure is led to a low-coast modulator valve through a governor valve to vary a hydraulic pressure for the engine-brake according to the vehicle speed.

The above-mentioned modulator valve reduces the line pressure and supplies it to the hydraulic servos of the second-coast brake and the first & reverse brake so that shift shock is reduced. However, in the modulator valve, as represented in FIG. 6 by dotted lines, the pressure is constantly reduced regardless of vehicle speed.

Consequently, even if a manual valve is shifted to the second range or the L range at a high speed, the engine-brake is not sufficiently carried out because the second-coast brake or the first & reverse brake are not provided with enough torque. On the contrary, when a vehicle is running at low speed, the brake torque is too large compared to vehicle inertia during low speed running, so that the engine-brake is effected with too strong of a force. Due to these occurrences, the shifting operation is quite laborious, and riding comfort is poor because the engine-brake is delayed at high speeds and is effected by a strong force at low speeds.

With reference to the above-mentioned device which varies the hydraulic pressure in the brake servo according to vehicle speed by the governor valve, as shown in FIG. 10, a brake torque capacity X based on the governor valve is designed to be small within a middle speed area Q because of a centrifugal force generated by the governor weight, while the torque capacity is designed to be large within high speed area R. Subsequently, the brake torque capacity necessary for facilitating an engine-brake Y is not enough, so that slip occurs between the brake and a gear element. In the high speed area R, the brake torque capacity is too large compared to that necessary to effect the engine-brake Y, so that a sharp shift shock occurs.

When a foot brake is applied during the engine-brake, in particular, if the hydraulic pressure of engine-brake hydraulic servo is designed to vary with the vehicle speed, the driving wheels may lock. Furthermore, when a vehicle runs on roads having a low coefficient of friction such as those covered with snow, the driving wheels may slip because the torque required for effecting an engine-brake is too large.

SUMMARY OF THE INVENTION

The object of the present invention is to solve the above-mentioned disadvantages by controlling hydraulic pressure supplied to a brake hydraulic servo through a pressure control valve (for example, a linear solenoid valve) which is controlled by an electronic control unit.

The present invention, taking the above-mentioned situation into consideration, provides, for example, as shown in FIG. 1, the following: in a hydraulic control device for an automatic transmission including a brake directly restraining a certain element of a gear mechanism, a hydraulic servo (B1) or (B3) to control the brake, shift valves (60), (61) to supply or drain hydraulic pressure used to actuate the brake servo, modulator valves (66), (65) are situated in oil passages connected to the hydraulic servo (B1) or (B3); and these modulator valves are controlled by a pressure control valve (S4) which is in turn controlled by signals from a control unit (C) which signals are produced based on vehicle running conditions.

More specifically, as shown in FIG. 1, a speed sensor (46) sends signals to the control unit (C). The unit (C) dispatches signals to the pressure control valve (S4) so that the hydraulic pressure of the hydraulic servo (B1) or (B3) is kept low when vehicle speed is low while the hydraulic pressure of the servo is kept high when vehicle speed is high.

The control unit (C) receives signals from a brake sensor (47), which detects the operation of a foot brake, in addition to receiving signals from the sensor (46) so that when the foot brake is applied the pressure control valve (S4) is controlled to reduce the hydraulic pressure of the servo, which is varied according to the vehicle speed.

The control unit (C) receives signals from a front wheel rotation detecting sensor (48) and a rear wheel rotation detecting sensor (49) and calculates the difference of rotation so that the pressure control valve (S4) keeps the hydraulic pressure of the servo low when a difference between the rotation of the front and the rear wheels is large while the valve (S4) keeps the pressure of the servo high when said difference is small.

Furthermore, for example, the brakes can take the form of a second-coast brake (B1) which is actuated at the second speed of ranges other than D range, and a first & reverse brake (B3) which is actuated at the first speed. To the second-coast brake hydraulic servo (B1) is supplied line pressure (p) from a port (b). The line pressure is supplied from port (b) at the second range and L range of a manual valve (51) through ports (b1), (f) of a 2-3 shift valve (61), ports (f1), (g) of a 1-2 shift valve (60) and ports (g1), (h) of a second-coast modulator valve (66). Hydraulic pressure in the servo (B1) is drained through a check ball (91) without passing through the modulator valve (66). On the other hand, to the first & reverse brake hydraulic servo (B3) is supplied line pressure (p) from a port (c). The line pressure is supplied from port (C) at the L range of the manual valve (51) through ports (c1), (i) of the 2-3 shift valve (61), ports (i1), (j) of the low-coast modulator valve (65), ports (j1), (k) of the 1-2 shift valve (60), and a check ball (90).

The second-coast modulator valve (66) has a control chamber (m2) in which control hydraulic pressure from a port (m) of an accumulator control valve (72) acts, and the low-coast modulator valve (65) has a control chamber (m3) in which control hydraulic pressure from a port (m) of the accumulator control valve (72) acts. The accumulator control valve (72) has a port (n1) to which hydraulic pressure from ports (n), (n) of the pressure control valve (S4) is supplied. Valve (S4) is controlled by electric signals of the control unit (C) which receives the signals from the speed sensor (46), the brake sensor (47), and the front and rear wheel rotation sensors (48), (49). Consequently, regulated pressure is applied to the port (n1) so that the line pressure applied to a port (p2) is regulated and such regulated pressure issues from port (m) of the accumulator control valve (72). A port (o) of the pressure control valve (S4) is supplied with reduced pressure from a solenoid modulator valve (73).

Based on the above structure, when an engine-brake is effected by the brake (B1) or (B3), the hydraulic pressure regulated through the modulator valve (66) or (65) which is controlled by the pressure control valve (S4) is applied to the brake hydraulic servo. At this time, the solenoid valve (S4) is controlled by signals based on a vehicle running condition such as the speed of the vehicle as sensed by sensor (46). Accordingly, high hydraulic pressure is applied when a vehicle runs at a high speed, while low hydraulic pressure is applied when a vehicle runs at a low speed. Because of these occurrences, the force effecting the engine-brake is adequately controlled according to vehicle speed. Furthermore, for example, the following provisions are also possible. Due to the signal issued by the brake sensor (47), the hydraulic pressure according to a vehicle speed can be kept low when the foot brake is applied. And due to the signals of the front and rear wheel rotation sensors, the control unit (C) calculates a rotation difference, and the force effecting engine-brake is kept low when the rotation difference between the front and rear wheels is large.

More specifically, when the engine-brake is effected at the second speed condition by shifting the manual valve (51) to the second range, the line pressure from the port (b) of the manual valve (51) is applied to the port (g1) of the second-coast modulator valve (66) through the ports (b1), (f) of the 2-3 shift valve (61) and the ports (f1), (g) of the 1-2 shift valve (60). Moreover, the hydraulic pressure is regulated based on the control pressure in the control chamber (m2). The regulated pressure is applied to the second-coast brake hydraulic servo (B1). At this time, the pressure control valve (S4) is controlled by the signal from the control unit (C) to which unit signals generated by each of sensor (46), (47), (48), (49) are issued. Then hydraulic pressure applied to the port (o) is regulated and issues from the ports (n), (n). Subsequently, the pressure from the ports (n), (n) is applied to the port (n1) of the accumulator control valve (72) where the line pressure of the port (p2) is regulated by the line pressure (p1) and the hydraulic pressure at the port (n1). Thus, the regulated hydraulic pressure is supplied from the port (m) of the accumulator control valve (72) to the control member (m2) of the second-coast modulator valve (66). Due to the above occurrences, the engine-brake hydraulic pressure generated varies, as shown in FIG. 6, depending on three running conditions: (D)—high constant pressure at speeds greater than a predetermined speed; (E)—hydraulic pressure proportional to vehicle speed at middle speeds; and (F)—low constant pressure at low speeds. Or engine-brake hydraulic pressure (G) which is proportional to vehicle speed is generated over the entire range of vehicle speeds.

When the engine-brake is effected at the first speed by shifting the manual valve (51) to the L range, the line pressure is supplied from the port (c) of the manual valve (51) to the port (i1) of the low-coast modulator valve (65) through the ports (c1), (i) of the 2-3 shift valve (65). In the valve (65), the line pressure is regulated based on the control pressure of the control chamber (m3) and is applied to the first & reverse brake hydraulic servo (B3). At this time, as stated before, the control pressure is generated by the pressure control valve (S4) and the accumulator control valve (72). Then the engine-brake hydraulic pressure is generated as shown in FIG. 6 by continuous line and dotted lines.

The means to control the modulator valve is not limited to the above accumulator control valve (72). It is of course possible to connect a regulated pressure generating means such as a linear solenoid valve directly to a control chamber of the modulator valve.

Incidentally, the reference numerals in a parentheses are used only for reference with the drawings and do not define the invention. The same reference characters may be used differently in the following description and in the previous description in which broader concepts are summarized.

BRIEF DESCRIPTION OF THE DRAWINGS

In the drawings:

FIG. 4 is a hydraulic circuit diagram of the automatic transmission;

FIG. 5 is a table of operation of solenoid valves, clutches, brakes and one-way clutches at each shifting position;

FIG. 6 is a graphical representation showing engine-brake hydraulic pressure vs. vehicle speed;

FIG. 7 is a graphical representation of engine-brake skid control in which

FIG. 7 (a) is a graphical representation showing time vs. front and wheel rotational speed, and FIG. 7 (b) is a graphical representation showing time vs. hydraulic of a hydraulic servo;

DETAILED DESCRIPTION OF THE PREFERRED EMBODIMENT

The present invention will now be explained with reference to the drawings.

Figure 2:
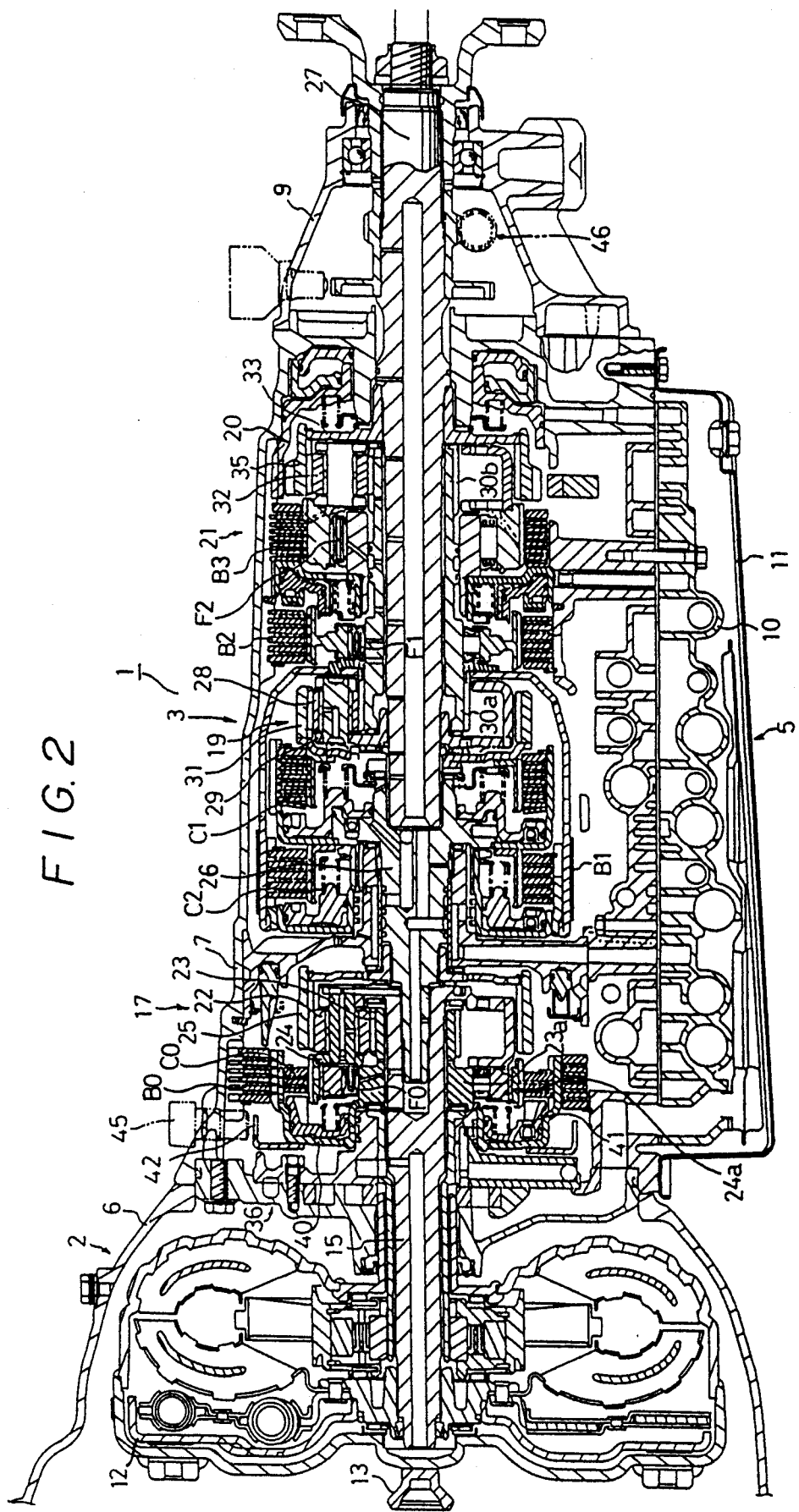
FIG. 2 is a cross-sectional view of the automatic transmission to which the present invention is applied.
Figure 3:
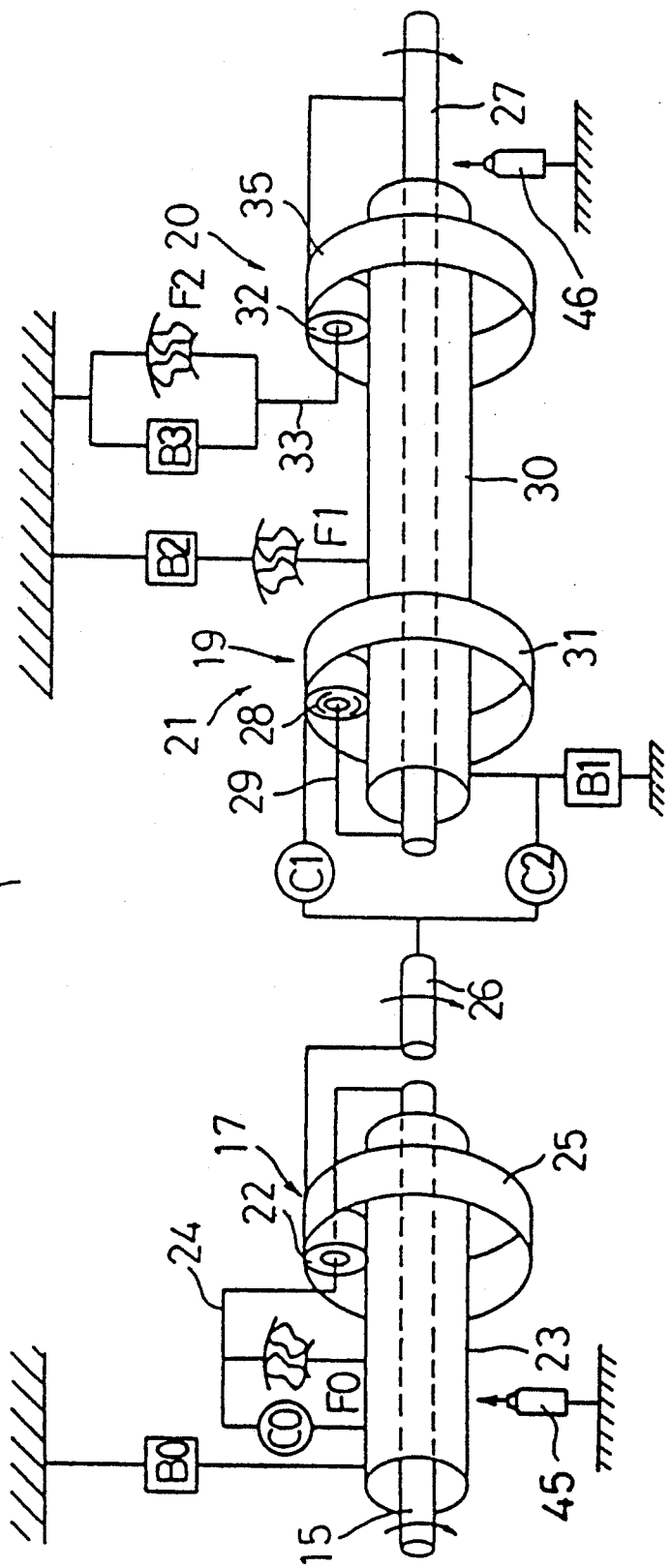
FIG. 3 is a schematic representation of the automatic transmission.

An automatic transmission 1, as shown in FIGS. 2 and 3, has a torque converter 2, a planetary transmission gear mechanism and a hydraulic control device 5 which are housed in a converter housing 6, a transmission case 7, an extension housing 9, a valve body 10 and an oil pan 11. The torque converter 2 has a lock-up clutch 12. Rotation of an input member 13 is transmitted to an input shaft 15 of the transmission gear mechanism 3 through hydraulic fluid in the torque converter 2 or through the lock-up clutch 12. The transmission gear mechanism 3 comprises a main transmission unit 21 including an over-drive planetary gear unit 17, a front planetary gear unit 19 and a rear planetary gear unit 20. The over-drive planetary gear unit 17 comprises a planetary pinion 22, a carrier 24 which is directly connected to the input shaft 15 and supports the pinion 22, a sun gear 23 which encircles the input shaft 15, and a ring gear 25 which is connected to an input shaft 26 of the main transmission mechanism 21. An over-drive direct clutch C0 and a one-way clutch F0 are situated between the carrier 24 and the sun gear 23, and an over-drive brake B0 is situated between the sun gear 23 and the case 7. The front planetary gear unit 19 comprises a planetary pinion 28, a carrier 29 which is directly connected to an output shaft 27 and supports the pinion 28, a sun gear 30a which encircles the output shaft 27 and is integral with a sun gear 30b of the rear planetary gear unit 20, and a ring gear 31 which is connected to the input shaft 26 through a forward clutch C1. A direct clutch C2 is situated between the input shaft 26 and the sun gear 30, a second-coast brake B1 in the form of a band brake is situated between the sun gear 30 and the case 7, and a one-way clutch F1 and a second brake B2 are radially situated between the sun gear 30 and the case 7. The rear planetary gear unit 20 comprises a planetary pinion 32, a carrier 33 which supports the pinion 32, a sun gear 30b, and a ring gear 35 which is directly connected to the output shaft 27. A first & reverse brake B3 and a one-way clutch F2 are situated radially between the carrier 33 and the case 7. Incidentally, reference numeral 36 in FIG. 2 designates an oil pump.

And, as shown in FIG. 2, with regard to the over-drive planetary gear unit 17, the one-way clutch F0 is situated between a boss 23a of the sun gear 23 and a sleeve 24a of the carrier 24. A flange member 40 which constitutes a cylinder extends from the boss 23a. The flange member 40 encloses a piston member 41 to form a hydraulic actuator of the clutch C0. The over-drive direct clutch C0 is situated between the sleeve 24a and an inner surface of the flange member 40. The over-drive brake B0 is situated between an outer surface of the flange member 40 and the case 7. Furthermore, a rim 42 is fixed on a peripheral part of the flange member 40. A non-contacting type sensor 45 such as one employing light or a magnet and the like is situated on the case 7 so that the sensor 45 faces a plurality of through holes or slits which are formed in the rim 42. The sensor 45 is situated to detect the rotational speed of the clutch C0, in other words, to detect the rotational speed of the rim 42 which rotates together with the input member 15 at the first, second and third speeds.

A speed sensor 46 which detects the vehicle speed is situated in the extension case 9. Electric signals of the sensor 45, 46 and other sensors are sent to a control unit C to control solenoid valves S1, S2, S3 and S4 which will be described later.

Next, a hydraulic control device 5 is explained with reference to FIG. 4.

C0, C1 and C2 designate hydraulic servos for each clutch, B0, B1, B2 and B3 designate hydraulic servos for each brake, reference numeral 2 designates the torque converter and 36 the oil pump. Reference numeral 51 designates a manual valve in which a line pressure port p is connected to ports a, b, c and d which correspond to ranges R, P, N, D, S and L, as shown in the table in FIG. 4. Reference numeral 52 designates a primary regulator valve, 52 a throttle valve, 55 a secondary regulator valve, 56 a lock-up control valve, 57 a lock-up relay valve, 58 a solenoid relay valve, and 59 a cutback valve. Reference numeral 60 designates a 1-2 shift valve, 61 a 2-3 shift valve, 62 a 3-4 shift valve, 63 a reverse inhibit valve, 65 a low-coast modulator valve, and 66 a second-coast modulator valve. Reference numeral 67 designates an accumulator for the clutch C0, 70 an accumulator for the clutch C2, and 71 an accumulator for the brake B2. Reference numeral 72 designates an accumulator control valve which regulates hydraulic pressure applied to back pressure chambers 69a, 70a and 71a of the accumulators 69, 70 and 71, and controls the low-coast modulator valve 65 and the second-coast modulator valve 66. S1, S2 designate solenoid valves to control the shift valves 60, 61 and 62. S3 designates a linear solenoid valve which supplies regulated hydraulic pressure to the lock-up control valve 56 and the lock-up relay valve 57 and regulates the line pressure. S4 designates a linear solenoid valve which regulates hydraulic pressure from a solenoid regulator valve 73, and the regulated pressure is applied to the accumulator control valve 72.

Figure 1:
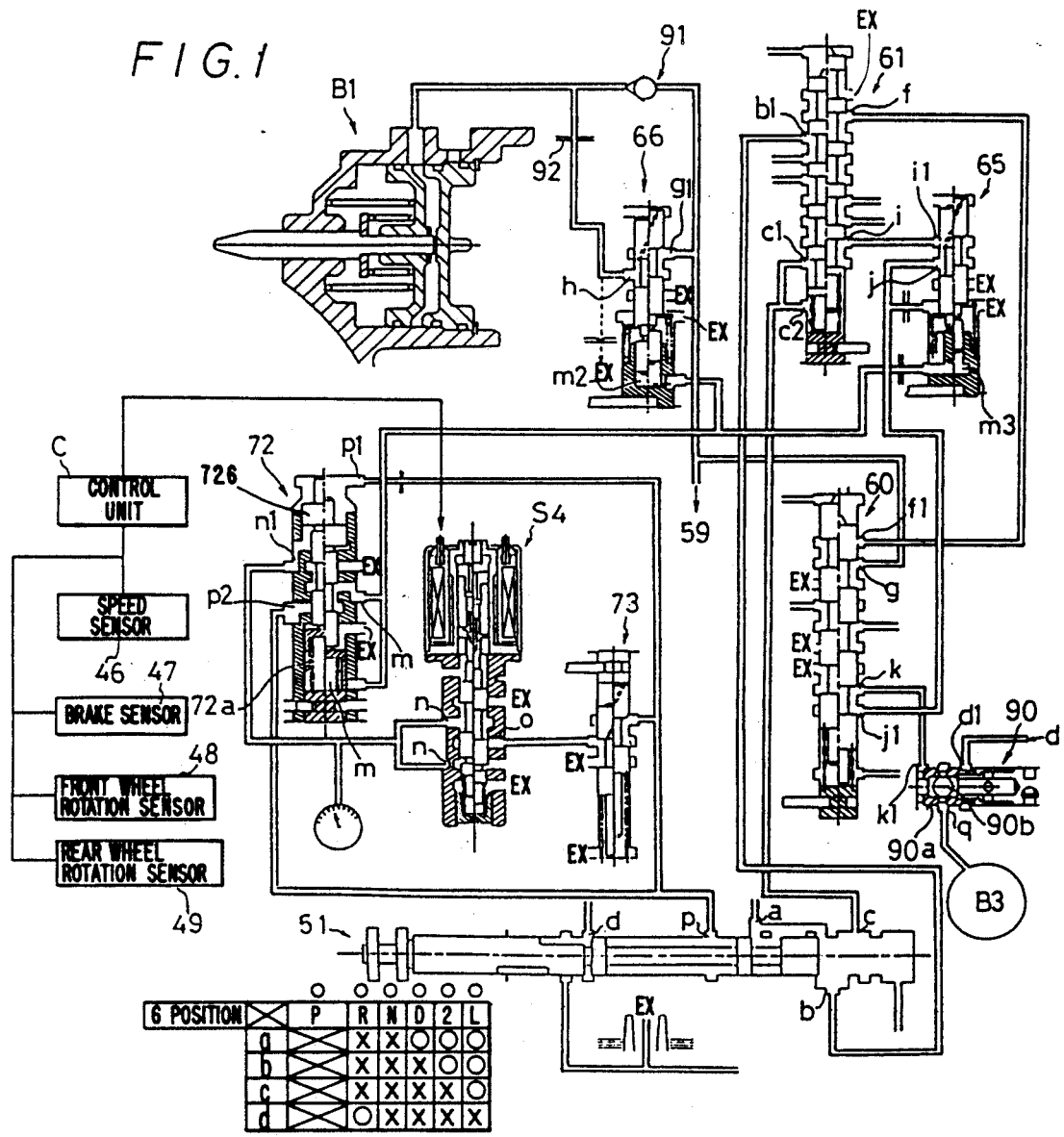
FIG. 1 is a hydraulic circuit diagram of a main part of an engine-brake control device for an automatic transmission, according to the present invention.

Next, an engine-brake control device which is a main part of the present invention will be explained with reference to FIG. 1.

The engine-brake control device controls a supply of hydraulic pressure to the second-coast brake hydraulic servo B1 which is actuated at the second speed of the second range and the L range, and to the first & reverse brake hydraulic servo B3 which is actuated at the first speed of the L range. The engine-brake control device includes the second-coast modulator valve 66 and the low-coast modulator valve 65 which are situated in oil passages to the servos, the accumulator control valve 72 controlling the modulator valves, the linear solenoid valve S4 and the solenoid modulator valve 73.

The port b, in the manual valve 51, where the line pressure is applied at the second range of the manual valve 51 is connected to the port b1 of the 2-3 shift valve 61. The 2-3 shift valve 61 is in an upper-half position (which means the position of the spool depicted at the right side of the spool in FIG. 1) at the second speed, so that the port b1 and the port f are open to one another. Furthermore, the port f is connected to the port f1 of the 1-2 shift valve 60. The 1-2 shift valve 60 is in an upper-half position (which means the position of the spool depicted at the left side of the spool in FIG. 1) at the second speed, so that the port f1 and the port g are open to one another. The port g is connected to the port g1 of the second-coast modulator valve 66. The hydraulic pressure at the port g1 is regulated by control pressure in a control chamber m2, and the regulated pressure issues from the port h to the second-coast brake hydraulic servo B1. The drain pressure from the servo B1 is led to the port g of the 1-2 shift valve 60 through the check ball 91, and is drained through the drain port EX.

The port c, in the manual valve 51, where the line pressure p is applied at the L range of the manual valve 51, is connected to the port c1 of the 2-3 shift valve 61. At the first speed, the line pressure from the port c is applied to the lower chamber c2, so that the valve 61 is in the right-half position, whereby the port c1 and the port i are open to one another. The port i is connected to the port i1 of the low-coast modulator valve 65. The pressure at the port i1 is regulated by control pressure of a control chamber m3, and this regulated pressure issues from the port j to the port j1 of the 1-2 shift valve 60. At the first speed, the valve 60 is in the right-half position, so that the port j1 and the port k are open to one another. The hydraulic pressure from the port k is applied to the first & reverse brake hydraulic servo B3 through a check valve 90. Incidentally, the check valve 90 has a port d1 which is connected to the port d of the manual valve 51, to which port d the line pressure is applied at the reverse range, and a port k1 which is connected to the port k. By the hydraulic pressure applied at one of these ports d1, k1, a ball 90b in a sleeve 90a is moved so that the pressure is applied to the servo B3 from the port q.

On the other hand, the accumulator control valve 72 has a port p2 to which the line pressure is applied, a first control chamber p1 to which the line pressure is applied on the top of spool, a second control chamber n1 to which the control pressure from the linear solenoid valve S4 is applied, a regulating port m which regulates the line pressure of the port p2, and is connected to the control chambers m2, m3 of the second-coast modulator valve 66 and the low-coast modulator valve 66, respectively, and a feedback chamber m1 within which hydraulic pressure works together with the pressure of the control chamber n1 and the pressing force exerted by the spring 72a against the line pressure in the control chamber p1. The linear solenoid valve S4 is controlled by electric signals of the control unit C which are issued based on the signals of speed sensor 46, brake sensor 47, front wheel rotation sensor 48 and rear wheel rotation sensor 49. The port o of the valve S4 is supplied with a reduced line pressure by the solenoid modulator valve 73. Then the reduced line pressure is regulated in the valve S4 and is output to the ports n, n. The hydraulic pressure from the ports n, n is applied to the control chamber n1 of the accumulator control valve 72.

In addition to the above, as shown in FIG. 4, the pressure from the port m of the accumulator control valve 72 is applied to the back pressure chambers 69a, 70a and 71a of the B0 accumulator 69, C2 accumulator 70 and B2 accumulator 71 as well as the control chambers m2, m3 of the modulator valves 66, 65. An oil passage open to the second-coast brake hydraulic servo B1 is connected to an upper control chamber r of the cutback valve 59 so that cutback operation by the cutback valve 59 is stopped when the second-coast brake B1 is actuated.

The operation of the above-described embodiment will now be explained.

The solenoid valves S1, S2 and S3, the clutches C0, C1 and C2, the brakes B0, B1, B2 and B3, and the one-way clutches F0, F1 and F2 are operated at the positions of P, R, R (when the vehicle speed is more than 7 km/h), N, D, 2 and L ranges, as shown in FIG. 5.

In other words, at the first speed of the D or 2 range, the solenoid valve S1 is ON so that the over-drive direct clutch C0, the one-way clutch F0, F2 and the forward clutch C1 are engaged, and all of the other friction-engaging elements are released. Accordingly, all elements of the over-drive planetary gear unit 17 rotate together through the clutch C0 and the one-way clutch F0. Thus, rotation of the input shaft 15 is transmitted to the input shaft 26 of the main transmission unit 21 without a reduction in the rotational speed thereof. In the main transmission unit 21, rotation of the input shaft 26 is transmitted to the ring gear 31 of the front planetary gear unit 19, and is transmitted to the carrier 29 and the output shaft 27 which is integrally connected to the carrier 29. At the same time, the rotation is transmitted to the carrier 33 of the rear planetary gear unit 20, and the carrier 33 is subjected to torque in the left rotational direction. However, because the carrier 33 is retrained by the one-way clutch F2, the planetary pinion 32 rotates, and this rotation is transmitted to the ring gear 35 which is integrally connected to the output shaft 27.

At the second speed of the D range, the solenoid valve S2 is ON in addition to the solenoid valve S1. The over-drive direct clutch C0, the one-way clutch F0, the forward clutch C1, the one-clutch F1 and the second brake B2 are engaged, and all of the other elements are released. Accordingly, the over-drive planetary gear 17 is still under the direct operating condition, whereby the rotation of the input shaft 15 is transmitted to the input shaft 26 without a reduction in the rotational speed thereof. In the main transmission unit 21, rotation of the input shaft 26 is transmitted to the ring gear 31 through the forward clutch C1, and the sun gear 30 is subjected to torque in the left rotational direction through the pinion 28. However, the sun gear 30 is restrained from rotating in the left rotational direction by the operation of the one-way clutch F1 because of engagement of the brake B2. Consequently, the planetary pinion 28 rotates and the carrier 29 rotates. Then, the rotation of the carrier 29 is directly transmitted to the output shaft 27, namely the rotation is transmitted only through the front gear unit 19 to the output shaft 27.

At this moment, when friction plates of the second brake B2 start to contact owing to the application of hydraulic pressure to the B2 hydraulic servo, the output torque varies. As a result, the rotational speed of the flange member 40 which rotates together with the input shaft 15 also varies. The varied rotation is detected by the sensor 45. Then the solenoid valve S4 is controlled by the electric signals of the control unit C based on signals issued by the sensor 45. Consequently, hydraulic pressure applied from the solenoid modulator valve 73 is regulated in the solenoid valve S4 and such regulated pressure is issued from the ports n, n as a predetermined control hydraulic pressure. The predetermined control pressure is applied to the port n1 of the accumulator control valve 72. The control valve 72 is in the right-half position (FIG. 1) owing to hydraulic pressure being supplied to the first control chamber p1 through an orifice, and the line pressure applied from the port p2 is issued from the port m to the back pressure chamber 71a of the accumulator 71. From the above state of the control valve 72, the control pressure from the port m acts on a bulged section of the spool, and the pressure, with the pressing force of the spring 72a, moves the spool against the line pressure in the first control chamber p1. Consequently, the line pressure of the port p2 is reduced in accordance with the control pressure and issues from the port m. The reduced pressure issues from the feedback port m1 to a lower part of the spool 72. At the same time the reduced pressure is applied to the back pressure chamber 71b of the accumulator 71. Because of these events, the accumulator back pressure is reduced by a certain volume over a certain duration of time. Furthermore, after a certain amount of time, the accumulator back pressure is gradually reduced based on the control pressure from the linear solenoid valve S4, and the output torque smoothly varies. Thus, when shifting from the first speed to the second, a shift-shock normally caused by the engagement of the second brake B2 is reduced, so that a shift-up operation is conducted smoothly.

At the third speed of the D or second range, the solenoid valve S1 is OFF, the over-drive direct clutch C0, the one-way clutch F0, the forward clutch C1, the direct clutch C2 and the second brake B2 are engaged, and all of the other friction-engaging elements are released. As a result, the over-drive planetary gear unit 17 is under the direct operating condition, and in the main transmission mechanism 21, the elements of the front planetary gear unit 19 rotate together because the clutch C1 and C2 are engaged. Thus, rotation of the input shaft 26 is transmitted to the output shaft 27 without a reduction in the rotational speed thereof.

The 2-3 shift valve 61 is switched due to the solenoid valve S4 being OFF, and the direct clutch C2 is engaged. At this moment, as with the B2 accumulator 71, predetermined hydraulic pressure is applied to the back pressure chamber 70a of the C2 accumulator 70, so that shift shock is reduced when shifting from the second to the third speed similar to the results obtained when shifting from the first to the second speed.

At the fourth speed of the D range, or the highest shift stage, the solenoid valve S2 is also OFF, the forward clutch C1, the direct clutch C2, and the second brake B2 are engaged. The main transmission mechanism 21, as in the third speed, is under the direct operating condition, while in the over-drive planetary gear unit 17, the direct clutch C0 is released and the over-drive brake B0 is engaged. Accordingly, the sun gear 23 is fixed from rotating by the brake B0, and the planetary pinion 22 rotates with the carrier 24 which also rotates. Such rotation is transmitted to the ring gear 25 are an over-drive rotation, and the over-drive rotation is transmitted to the input shaft 26 of the main transmission mechanism 21 which is under the direct operating condition.

At this time, because of the release of the direct clutch C0 and the engagement of the brake B0, rotation of the rim 42 which is integrally connected to the flange member 40 connected to the sun gear 23 is restrained. This state is detected by the sensor 45. A predetermined hydraulic pressure is applied to the back pressure chamber 69a of the B0 accumulator 69, so that hydraulic pressure for the brake B0 is controlled. On the other hand, in the direct clutch hydraulic servo C0, pressure rises comparatively quickly because of the accumulator 67 which is not subject to back pressure control, so that the clutch C0 is released earlier than the brake B0. However, the carrier 24 is still under the control of the one-way clutch F0 regardless of the release of the clutch C0. As a result, shifting from the third speed to the fourth is performed by the engagement of the brake B0 and the release of the clutch C0, and shift shock is reduced by the control of the B0 accumulator 69.

When down-shifting from the fourth to the third speed, the over-drive direct clutch C0 is engaged and the over-drive brake B0 is released. When down-shifting from the third to the second speed, the direct clutch C2 is released. Furthermore when down-shifting from the second to the first speed, the second brake B2 is released.

Under the above situation, the linear solenoid valve S4 is controlled by the electric signals from the control unit C based on signals issued by the speed sensor 45. Thus, the accumulator back pressure in the back pressure chambers 69a of the B0 accumulator 69, 70a of the C2 accumulator 70 and 71a of the B2 accumulator 71 are reduced by a certain amount over a certain time. Due to these events, shift shock is reduced when down-shifting in the same manner as when up-shifting, so that such shifting is performed smoothly.

When the manual valve 51 is shifted to the second range, the first and third speeds are output under the corresponding conditions in D range. When the second speed is output, the second-coast brake B1 is engaged in addition to the forward clutch C1, the over-drive direct clutch C0 and the second brake B2, so that the sun gear 30 of the main transmission mechanism 21 is restrained to effect the engine-brake. In other words, the line pressure from the port b through which the line pressure is supplied at the second range of the manual valve 51 is applied to the port b1 of the 2-3 shift valve 61, the ports b1 and f are open to one another due to the assumption of the right-half position by the shift valve 61, and from the port f, the line pressure is supplied to the port g1 of the second-coast modulator valve 66 through the ports f1, g of the 1-2 shift valve 60. The control unit C, responsive to the speed sensor 46, sends signals to the linear solenoid valve S4. The valve S4 regulates the hydraulic pressure at the port o to one corresponding to the vehicle speed. The regulated pressure issues from the ports n, n to the second control chamber n1 of the accumulator control valve 72. Due to the application of hydraulic pressure to the chamber n1, and seeing that the valve 72 is in the right-half position and the line pressure at the port p2 passes to the port m, the control pressure in the second control chamber n1, the pressing force exerted by the spring 72a situated at lower part of the spool, and the feedback pressure in the third control chamber m1 work together against the line pressure in the first control chamber p1, so that the line pressure of the port p2 is reduced by a predetermined amount and issues from the port m. The hydraulic pressure in the port m is supplied to the control chamber m2 of the second-coast modulator valve 66, and the hydraulic pressure from the port h is regulated, for example as shown in FIG. 6 with a chain line or full line, and is applied to the second-coast hydraulic servo B1. In the case in which the characteristic indicated by the chain line is employed, when a vehicle runs at comparatively high speed, high hydraulic pressure such as the line pressure and the like is applied to the control chamber m2 of the modulator valve 66, whereby the valve assumes the right-half position. Thus, high and constant pressure is generated (refer to the area D of FIG. 6) and the second brake B1 effects the engine-brake with a large amount of torque. When a vehicle slows down below a certain speed, hydraulic pressure to the hydraulic servo B1 is also reduced in proportion to the reduction in vehicle speed (refer to the area E of FIG. 6), and the second coast brake B2 effects an engine-brake with torque proportional to a vehicle speed. When the vehicle further slows down below another certain speed, hydraulic pressure applied to the servo B1 is low and constant (refer to the area F of FIG. 6), whereby the brake B1 effects the engine-brake smoothly with a small amount of torque.

Incidentally, by the operation of the accumulator control valve 72 when the engine-brake is effected, a predetermined hydraulic pressure is applied to the back pressure chamber 71a of the B2 accumulator 71. However, this application of pressure provides no significant effects against shift shocks.

The second speed of the L range corresponds to the second speed of the second range. At the first speed, the first & reverse brake B3 is engaged in addition to the forward clutch C1 and the over-drive direct clutch C0, so that the carrier 33 of the rear planetary gear unit 20 is restrained. Thus, the engine-brake is effected. Namely, the line pressure at the port c, through which the line pressure passes at the L range of the manual valve, is applied to the port c1 of the 2-3 shift valve 61. And because the valve 61 has been shifted to the right-half position by the line pressure acting in the chamber c2 at the first speed, the ports c1 and i are open to one another so that the line pressure is supplied from port i to the port i1 of the low-coast modulator valve 65. The modulator valve 65, as stated before, is regulated by the linear solenoid valve S4 and the control pressure from the port m of the accumulator control valve 72. The regulated pressure from the port j of the valve 65 is applied to the port k1 of the check ball 90 through the ports j1 and k of the 1-2 shift valve 60 which is in the right-half position. Furthermore, the pressure is applied from the port q to the first & reverse brake hydraulic servo B3. At this time, by the control pressure based on the speed sensor 46, the regulated pressure from the port j of the modulator valve 65 is applied to the servo B3, for example, as shown by the full line or chain line of FIG. 6. In the embodiment which has the characteristic shown by the full line, the pressure which is proportional to the reduction of vehicle speed is applied to the servo B3. Then, the brake B3 effects the engine-brake with a large torque when the vehicle is running at a high speed, and with gradually reducing torque corresponding to the inertial force of the vehicle which is reduced according to the reduction in vehicle speed.

It is possible to employ the signals issued by the brake sensor 47 with those issued by the speed sensor 46 by inputting the signals of the sensor 47 to the control unit C. Namely, as shown by G', E' and D' in FIG. 6, when the foot brake is applied, the engine-brake pressure is designed to be low to prevent a locking of the wheels.

Figure 7:
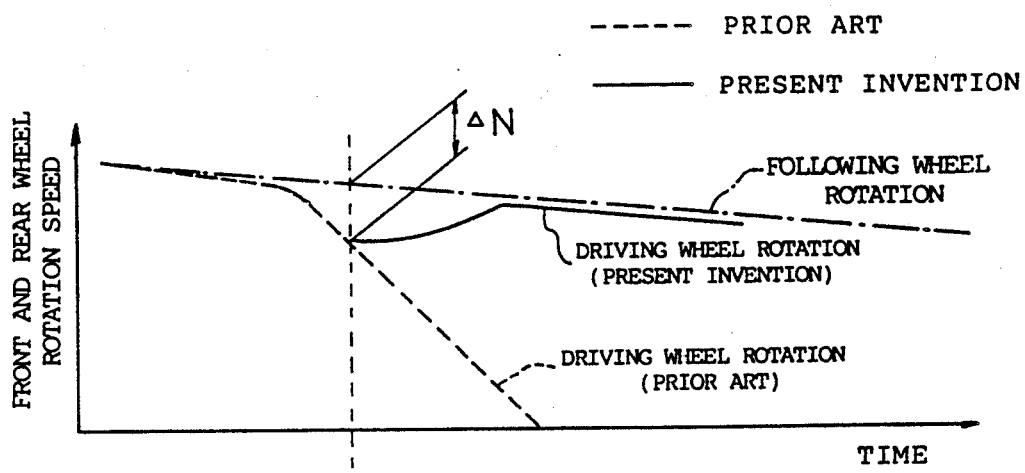
Figure 7:
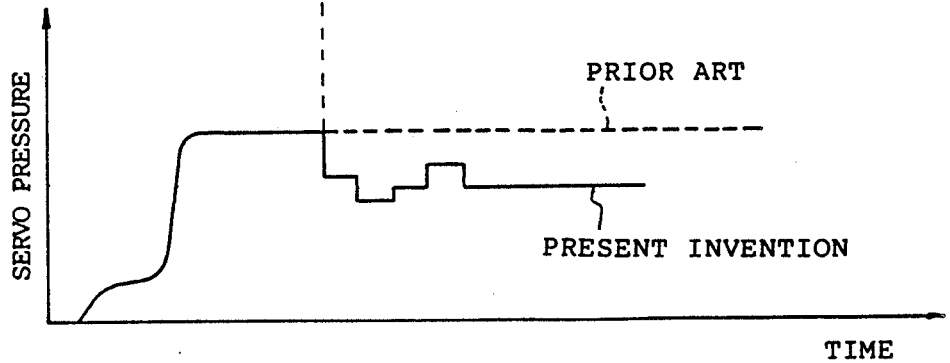

It is also possible to control the engine-brake pressure based on a difference in rotation between the front and rear wheels by calculating such difference in the control unit C to which the signals from the front wheel rotation sensor 48 and the rear wheel rotation sensor 49 are input. Namely, as shown in FIGS. 7(a), (b), in the case that the engine-brake is effected on a road having a low coefficient of friction such as one covered with snow, conventionally the driving wheel slips and a skid occurs due to a constant servo pressure. On the other hand, in the present invention, when a driving wheel slips resulting in a rotational difference $\Delta N$ between the driving wheel and the following wheels, then the servo pressure is reduced by a certain amount to reduce the torque working to drive the wheels. Thus, slipping of the driving wheels is prevented.

In the reverse range, the over-drive clutch C0, the one-way clutch F0, the direct clutch C2 and the first & reverse brake B3 are engaged, and all of the other elements are released. Accordingly the over-drive planetary gear unit 17 is under the direct operating condition, and in the main transmission mechanism 21, rotation of the input shaft 26 is directly transmitted to the sun gear 30 through the clutch C2. And, because the carrier 33 restrained by the brake B3, the rotation of the sun gear 30 is transmitted to the ring gear 35 as reverse rotation through the pinion 32 which rotates. Thus, the output shaft 27 rotates reversely.

When the manual valve 51 is shifted to the R range, if a vehicle speed is over a certain level, for example 7 km/h, the solenoid valve S2 is switched ON so that the direct clutch C2 is released. As a result, no reverse running condition occurs.

Figure 8:
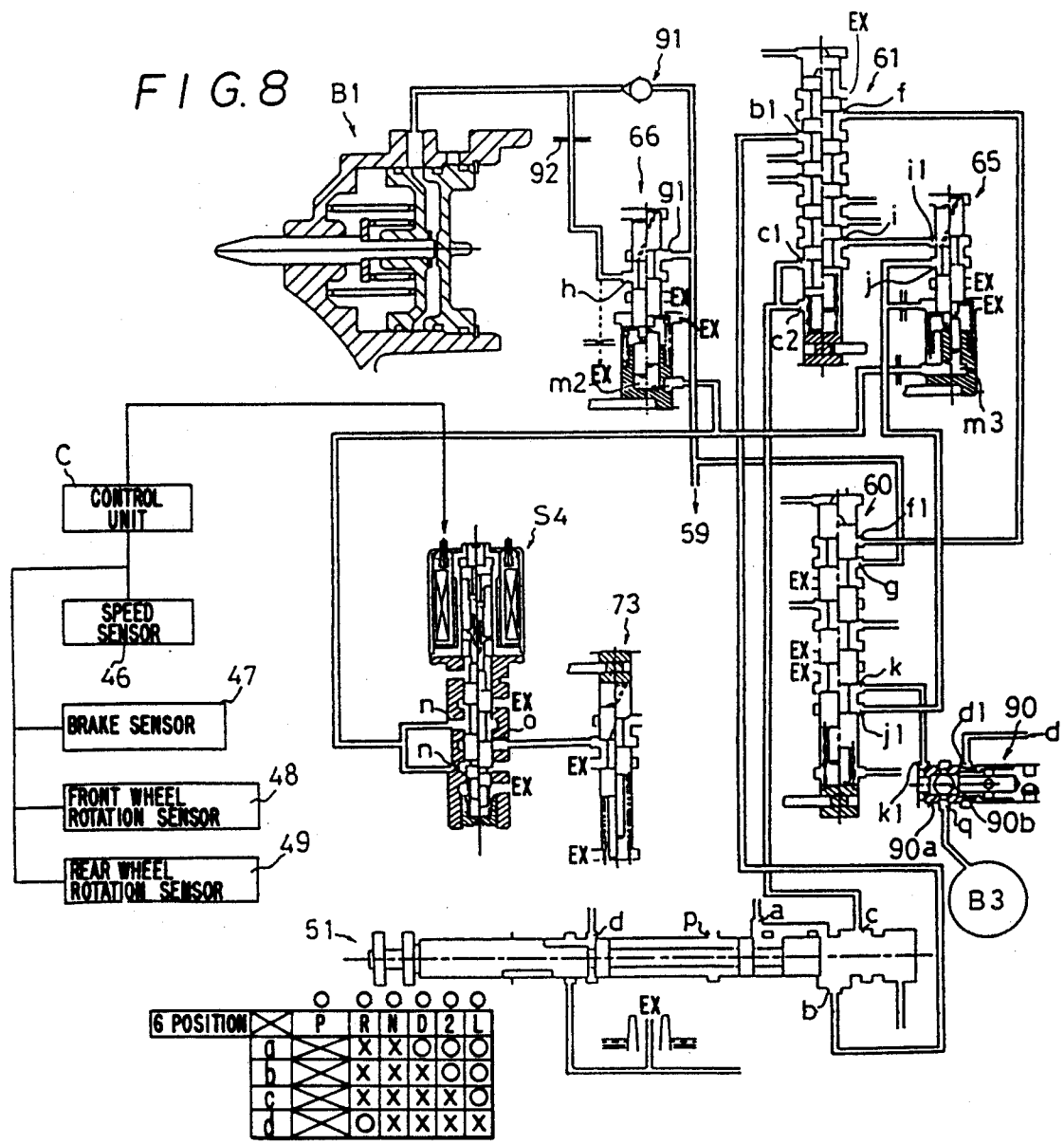
FIG. 8 is a hydraulic circuit diagram of a control device, which is a partially modified form of the first embodiment, according to the present invention.

Next, a partially modified form of the above-described embodiment will be explained with reference to FIG. 8.

In this embodiment, regulated hydraulic pressure from the linear solenoid valve S4 is invariably applied without an accumulator control valve. Predetermined hydraulic pressure is invariably applied to the control chambers m2, m3 of the modulator valves from the port n, n of the linear solenoid valve S4. Based on the speed sensor 46 which detects speed changes, the solenoid valve S4 is controlled to regulate the control pressure, and the regulated hydraulic pressure which is reduced by a certain amount is applied to the control chamber m2 of the second-coast modulator valve 66 and the control chamber m3 of the low-coast modulator valve 65.

Figure 9:
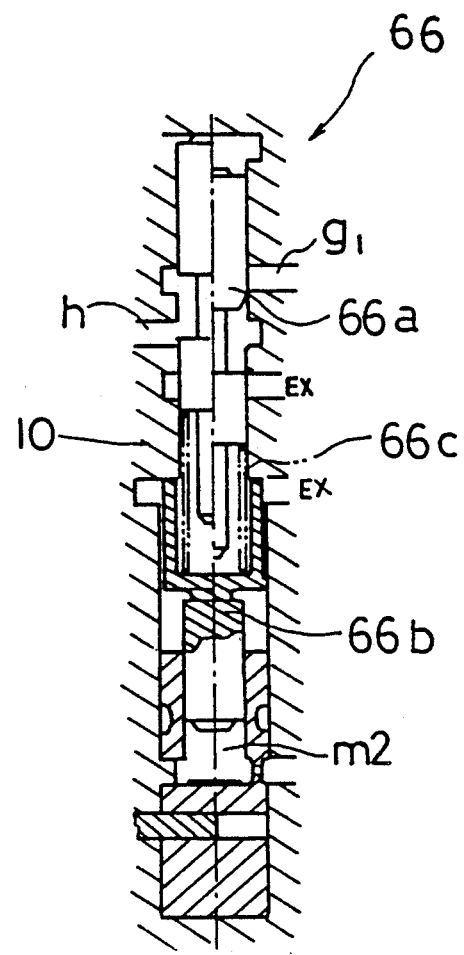
FIG. 9 is a cross-sectional view of a second-coast modulator valve.
Figure 10:
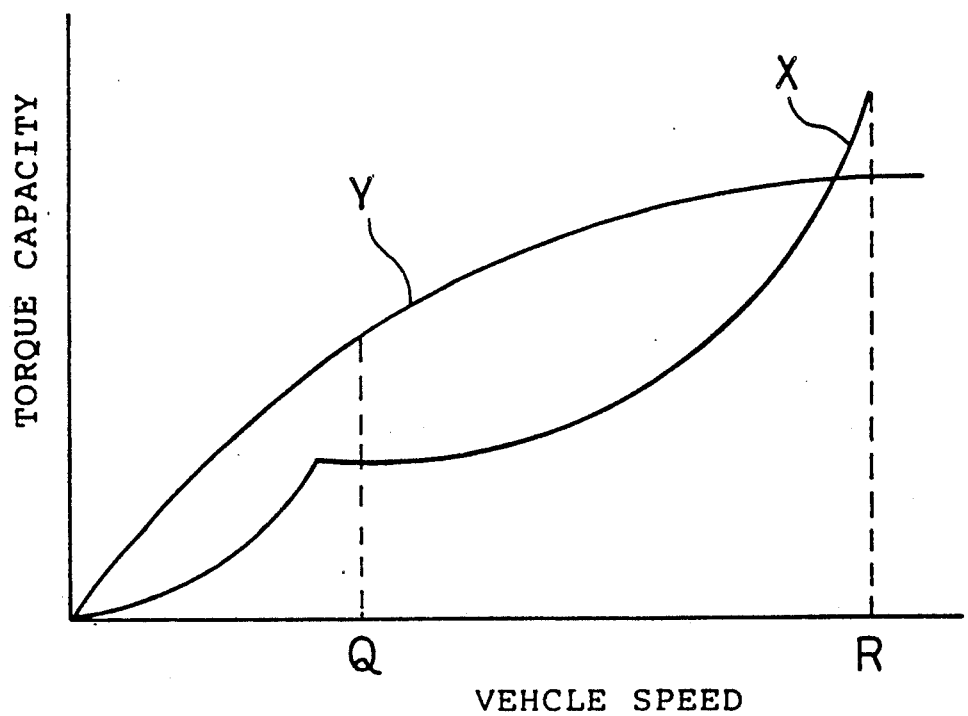
FIG. 10 is a graphical representation of an engine-brake characteristic influenced by a governor valve.

Furthermore, FIG. 9 shows a modified second modulator valve.

In the second modulator valve 66 shown in FIG. 9, a plug 66b, discrete from a spool 66a, is provided. Spring 66c is compressed between the spool 66a and plug 66b. A traveling distance of the plug 66b is limited by one end of the plug 66b contacting the valve body.

Consequently, even if the control pressure led to the control chamber m2 becomes high, the end of the plug 66b contacts the valve body 10, so that the regulated pressure from the port h, or the hydraulic pressure applied to the second-coast brake hydraulic pressure servo B1 is not further reduced. By this operation, the reduced and constant brake pressure (F) shown in FIG. 6 is easily obtained.

The above embodiments are described with reference to an automatic transmission having the over-drive planetary gear unit 17, or sub-transmission unit. However, in addition to this arrangement, the engine-brake control device is also applicable to an automatic transmission without the above sub-transmission unit.

Further, although the above embodiment is described with reference to a Simpson type transmission unit, the present invention is not limited in application to this type of unit. Rather, the engine-brake control device is also applicable to the Ravigneaux type transmission unit.

As explained above, the modulator valves (65), (66) are hydraulically connected to the hydraulic servos (B1) or (B3) of brakes which directly restrain certain elements of the transmission gear mechanism (3). These modulator valves are controlled by the pressure control valve (linear solenoid valve) (S4). Further, the pressure control valve (S4) is controlled by signals from the control unit (C) which signals are based on vehicle running conditions. Because of this arrangement, the engine-brake is adequately effected by the precise control of the pressure control valve (S4), so that the operation is easy and riding comfort is enhanced.

In the case that the hydraulic pressure of servos (B1), (B3) are to be controlled in accordance with vehicle speed sensed by the speed sensor (46) (refer to the lines E, G in FIG. 6), an adequate engine-brake force is provided when vehicle inertia is reduced upon the reduction of vehicle speed, so that the engine-brake force is not changed sharply.

Furthermore, due to the provision of the foot brake sensor (47) which inputs signals to the control unit (C), when the engine-brake is effected, the hydraulic servo pressure which varies in accordance with vehicle speed is set to be low, even when the foot brake and the engine-brake are actuated at the same time, whereby the locking of wheels is prevented.

In the case that the signals of the front and rear wheel rotation sensors (48), (49) are sent to the control unit (C) to control the solenoid valve (S4), the occurrence of slip is prevented when the engine-brake is effected. In particular, when hydraulic pressure of servos are set to be low when the rotational difference between front and rear wheels is small, while the hydraulic pressure of the servos are set to be high when the rotational difference is large, skidding is prevented when the engine-brake is effected on roads having a low coefficient of friction.

Furthermore, when the modulator valves (66), (65) are controlled by the accumulator control valve (72) which is controlled by the pressure control valve (S4), an accumulator back pressure control is realized without the addition of other control means.

We claim:

1. In an automatic transmission of a vehicle having a transmission mechanism including a plurality of gear elements, a brake operative to engage and restrain one of said elements to effect an engine-brake, a hydraulic servo associated with said brake for controlling said brake to engage and release said one of said elements, and a shift valve operatively hydraulically connected to said servo for allowing hydraulic fluid to be supplied to or drained from said servo, an engine brake control device for controlling the force at which the brake is controlled by the hydraulic servo to engage said one of said elements and effect the engine brake, said device comprising:

a modulator value operatively hydraulically connected between said shift valve and said hydraulic servo for modulating the pressure of hydraulic fluid supplied to said servo from said shift valve;

a pressure control valve operatively hydraulically connected to said modulator valve for providing a selective control of the modulator valve that establishes the modulated pressure of the hydraulic fluid supplied to said servo from said shift valve;

first sensor means for sensing one running condition of the vehicle from the group including the speed of the vehicle, the application of a foot brake in the vehicle, and the state of rotation of wheels in the vehicle and for issuing signals indicative of said one running condition;

second sensor means for sensing another running condition of said group and for issuing signals indicative of said another running condition; and an electronic control unit operatively connected to said pressure control valve and to said first and said second sensor means for receiving the signals issued by said first and said second sensor means, and for issuing signals based on the signals received to said pressure control valve which control said pressure control vale to provide the selective control of said modulator valve.

2. The engine brake control device in an automatic transmission as claimed in claim 1, wherein said modulator valve includes an input port in hydraulic communication with said shift valve, an output port in hydraulic communication with said hydraulic servo, a spool movable between respective positions at which said input and said output ports are open to and closed from one another, a plug, a spring extending between said plug and the spool for biasing said spool in one direction, a first chamber open to said output port at a location adjacent the spool at which pressure in the first chamber acts on the spool against said spring, and a second chamber in hydraulic communication with said pressure control valve at a location adjacent the spool at which pressure in the second chamber also acts against said spring.

3. The engine brake control device in an automatic transmission as claimed in claim 2, wherein said modulator valve further comprise a valve body in which said plug is movable, one end of said plug contacting said valve body at a surface thereof which limits movement of said plug within said valve body.

4. The engine brake control device in an automatic transmission as claimed in claim 1, wherein said pressure control valve is a linear solenoid valve.

5. The engine brake control device in an automatic transmission as claimed in claim 1, wherein said first sensor means senses the speed of the vehicle, and said control unit controls said pressure control valve to provide a selective control of said modulator valve in which said modulator valve modulates the pressure of the hydraulic fluid supplied to said servo to a high pressure when the vehicle is traveling at a speed greater than a predetermined speed and to a low pressure that is less than said high pressure when the vehicle is traveling at a speed that is less than said predetermined speed.

6. The engine brake control device in an automatic transmission as claimed in claim 5, wherein said second sensor means senses the application of a foot brake in the vehicle, and said control unit controls said pressure control valve to provide a selective control of said modulator valve in which said modulator valve modulates the pressure of the hydraulic fluid supplied to said servo to a low pressure when the application of the foot brake is sensed by said second sensor means.

7. The engine brake control device in an automatic transmission as claimed in claim 1, wherein said first sensor means senses the state of rotation of one of the front set of wheels and the rear set of wheels in the vehicle, and said second sensor means senses the state of rotation of the other of the front set of wheels and the rear set of wheels.

8. The engine brake control device in an automatic transmission as claimed in claim 7, wherein said first sensor means senses the state under which a non-driven wheel rotates and said second sensor means detects the state under which a positively driven wheel of the vehicle rotates.

9. The engine brake control device in an automatic transmission as claimed in claim 7, wherein said control unit calculates a difference between the state of rotation of the front and the rear sets of wheels, and controls said pressure control valve to provide a selective control of said modulator valve in which said modulator valve modulates the pressure of the hydraulic fluid supplied to said servo to a low pressure when said difference is a large predetermined amount and to a high pressure greater than said low pressure when said difference is small compared to said predetermined amount.

10. The engine brake control device in an automatic transmission as claimed in claim 1, and further comprising an accumulator having a back pressure chamber and an accumulator chamber in hydraulic communication with a hydraulic servo, and an accumulator control valve operatively hydraulically connected to said accumulator at said back pressure chamber, said accumulator control valve operatively hydraulically connected between said modulator valve and said pressure control valve for supplying hydraulic fluid to said back pressure chamber and for passing hydraulic fluid from said pressure control valve to said modulator valve which selectively controls said modulator valve.

* * * * *